(12) United States Patent
Chou

(10) Patent No.: US 8,014,369 B2
(45) Date of Patent: Sep. 6, 2011

(54) ADAPTIVE POWER MANAGEMENT METHODS AND SYSTEMS FOR WIRELESS NETWORKS

(75) Inventor: Zi-Tsan Chou, Taipei (TW)

(73) Assignee: Institute for Information Industry, Taipei (TW)

(*) Notice: Subject to any disclaimer, the term of this patent is extended or adjusted under 35 U.S.C. 154(b) by 782 days.

(21) Appl. No.: 11/640,196

(22) Filed: Dec. 18, 2006

(65) Prior Publication Data

US 2007/0275748 A1    Nov. 29, 2007

(30) Foreign Application Priority Data

May 29, 2006    (TW) ................................. 95118974 A

(51) Int. Cl.
*H04W 4/00*    (2009.01)
*H04B 7/00*    (2006.01)

(52) U.S. Cl. ....................................... 370/338; 455/522

(58) Field of Classification Search .................. 370/311, 370/318, 338
See application file for complete search history.

(56) References Cited

U.S. PATENT DOCUMENTS

| | | | | |
|---|---|---|---|---|
| 5,371,734 | A * | 12/1994 | Fischer .......................... | 370/311 |
| 5,974,327 | A * | 10/1999 | Agrawal et al. ............. | 455/452.2 |
| 6,072,784 | A * | 6/2000 | Agrawal et al. ............. | 370/311 |
| 6,108,316 | A * | 8/2000 | Agrawal et al. ............. | 370/311 |
| 6,674,738 | B1 * | 1/2004 | Yildiz et al. ................. | 370/338 |
| 7,302,227 | B2 * | 11/2007 | Sakoda ......................... | 455/41.2 |
| 7,454,634 | B1 * | 11/2008 | Donovan et al. ............. | 713/322 |
| 7,492,248 | B1 * | 2/2009 | Bjorkland et al. ............ | 340/7.2 |
| 7,505,795 | B1 * | 3/2009 | Lim et al. ...................... | 455/574 |
| 7,684,381 | B2 * | 3/2010 | Schrum et al. ................ | 370/350 |
| 7,747,273 | B2 * | 6/2010 | Chou ............................. | 455/522 |
| 7,848,277 | B2 * | 12/2010 | Chou et al. .................... | 370/318 |
| 2003/0002532 | A1 * | 1/2003 | Huo ............................... | 370/474 |
| 2003/0185182 | A1 * | 10/2003 | Young et al. .................. | 370/338 |
| 2003/0187952 | A1 * | 10/2003 | Young et al. .................. | 709/219 |
| 2004/0105401 | A1 * | 6/2004 | Lee ................................ | 370/311 |
| 2004/0253996 | A1 * | 12/2004 | Chen et al. .................... | 455/574 |

(Continued)

OTHER PUBLICATIONS

Distributed power management protocols for multi-hop mobile ad hoc networks. Shih-Lin Wu, Pao-Chu Tseng, Zi-Tsan Chou. Computer Networks (2005) available online Aug. 2004.*

(Continued)

*Primary Examiner* — Jinsong Hu
*Assistant Examiner* — William Nealon
(74) *Attorney, Agent, or Firm* — Birch, Stewart, Kolasch & Birch, LLP

(57) ABSTRACT

Adaptive power management methods and systems for a first station and a second station in a wireless network. Each station operating in the power-saving (PS) mode adaptively determines a "listen interval" (LI) according to residual power state, quality-of-service requirements, or other considerations. The LI is composed of a "normal beacon interval" (NBI) followed by the combination of "beacon-window-only beacon intervals" (BBIs) and "sleep beacon intervals" (SBIs). The LI value is one or a prime number which is larger than two, and the positions of the NBI and BBIs in an LI form a cyclic difference set. Each station broadcasts a beacon frame comprising at least information about "the remaining number of BIs (RBI)" within a beacon window. Once the first station correctly receives the beacon frame from the second station, the first station predicts the awake/sleep schedule of the second station, and transmits data frames to the second station at the NBI of the second station.

17 Claims, 11 Drawing Sheets

U.S. PATENT DOCUMENTS

| | | | |
|---|---|---|---|
| 2006/0028984 A1* | 2/2006 | Wu et al. | 370/230 |
| 2006/0079232 A1* | 4/2006 | Omori et al. | 455/436 |
| 2006/0193315 A1* | 8/2006 | Sinivaara et al. | 370/389 |
| 2006/0227801 A1* | 10/2006 | Nanda et al. | 370/447 |
| 2006/0280140 A9* | 12/2006 | Mahany et al. | 370/329 |
| 2006/0285527 A1* | 12/2006 | Gao et al. | 370/338 |
| 2006/0285528 A1* | 12/2006 | Gao et al. | 370/338 |
| 2007/0021155 A1* | 1/2007 | Yu et al. | 455/574 |
| 2007/0133448 A1* | 6/2007 | Gao et al. | 370/311 |
| 2007/0147423 A1* | 6/2007 | Wentink | 370/468 |
| 2008/0125190 A1* | 5/2008 | Jan et al. | 455/574 |
| 2009/0097464 A1* | 4/2009 | Sakoda | 370/338 |

OTHER PUBLICATIONS

Quorum-Based Asynchronous Power-Saving Protocols for IEEE 802.11 Ad Hoc Networks, Jiang; Tseng; Hsu; Lai. Mobile Networks and Applications 2005.*

An Adaptive Quorum-Based Energy Conserving Protocol for IEEE 802.11 Ad Hoc Networks, Chih-Min Chao, Jang-Ping Sheu, I-Cheng Chou. IEEE Transactions on Mobile Computing, vol. 5, No. 5, May 2006—published online Mar. 15, 2006.*

* cited by examiner

1300

| LI | Cyclic Difference Set embracing {0} |||||||||||
| --- | --- | --- | --- | --- | --- | --- | --- | --- | --- | --- | --- |
| | NBI position in LI | BBI position in LI |||||||||||
| 1 | 0 | | | | | | | | | | |
| 3 | 0 | 1 | | | | | | | | | |
| 5 | 0 | 1 | 2 | | | | | | | | |
| 7 | 0 | 1 | 3 | | | | | | | | |
| 11 | 0 | 1 | 2 | 5 | | | | | | | |
| 13 | 0 | 1 | 3 | 9 | | | | | | | |
| 17 | 0 | 1 | 2 | 4 | 12 | | | | | | |
| 19 | 0 | 1 | 2 | 6 | 9 | | | | | | |
| 23 | 0 | 1 | 2 | 3 | 7 | 11 | | | | | |
| 29 | 0 | 1 | 2 | 3 | 4 | 9 | 14 | | | | |
| 31 | 0 | 1 | 3 | 8 | 12 | 18 | | | | | |
| 37 | 0 | 1 | 2 | 4 | 10 | 15 | 22 | | | | |
| 41 | 0 | 1 | 2 | 3 | 4 | 9 | 15 | 25 | | | |
| 43 | 0 | 1 | 2 | 3 | 4 | 10 | 15 | 26 | | | |
| 47 | 0 | 1 | 2 | 3 | 5 | 16 | 22 | 40 | | | |
| 53 | 0 | 1 | 2 | 3 | 4 | 7 | 21 | 29 | 44 | | |
| 59 | 0 | 1 | 2 | 3 | 6 | 13 | 21 | 35 | 44 | | |
| 61 | 0 | 1 | 2 | 3 | 7 | 15 | 25 | 36 | 45 | | |
| 67 | 0 | 1 | 2 | 3 | 4 | 5 | 12 | 20 | 26 | 39 | |
| 71 | 0 | 1 | 2 | 3 | 4 | 10 | 18 | 23 | 34 | 46 | |
| 73 | 0 | 1 | 3 | 7 | 15 | 31 | 36 | 54 | 63 | | |
| 79 | 0 | 1 | 2 | 6 | 13 | 28 | 31 | 47 | 48 | 71 | |
| 83 | 0 | 1 | 2 | 3 | 4 | 5 | 12 | 21 | 27 | 40 | 54 |
| 89 | 0 | 1 | 2 | 3 | 5 | 12 | 18 | 43 | 57 | 65 | 71 |
| 97 | 0 | 1 | 2 | 3 | 4 | 5 | 9 | 17 | 33 | 43 | 54 | 79 |

FIG. 13

ADAPTIVE POWER MANAGEMENT METHODS AND SYSTEMS FOR WIRELESS NETWORKS

BACKGROUND OF THE INVENTION

1. Field of the Invention

The disclosure relates generally to medium access control with adaptive power management methods and systems, and, more particularly to methods and systems for use in wireless networks such as ad-hoc wireless networks, where stations adaptively determine the awake/sleep schedule according to residual power state, quality-of-service requirements, or other considerations, and transmit data accurately.

2. Description of the Related Art

Currently, IEEE 802.11 is the most popular international medium access control (MAC) standard for WLANs (Wireless Local Area Networks). Based on the network architecture, wireless networks can be approximately divided into: infrastructure WLANs and ad hoc networks. FIG. 1 is a schematic diagram illustrating an ad hoc network. As shown in FIG. 1, each station (110, 120, 130, 140 and 150) can dynamically communicate with adjacent stations for data transmissions.

FIG. 2 is a schematic diagram illustrating a power consumption model for a general wireless network interface card (or adapter). Each station can stay in one of transmission, reception, listen, or doze states. As shown in FIG. 2, power consumption is approximately between 1.6 W and 1.2 W when the station is in either the transmission, reception, or listen states, but close to zero when in the doze state. In IEEE 802.11 power management for ad hoc networks, time is divided into fixed-sized BIs (Beacon Intervals), each of which contains an ATIM (Announcement Traffic Indication Message) window. Each station in a power saving (PS) mode (or "power-saving station") must wake up at the beginning of each BI and remain awake in the ATIM window, awaiting the ATIM frame from other stations. If no ATIM frame is received in the ATIM window, then that station may enter a doze state after the ATIM window ends. If an ATIM frame is received in the ATIM window, then the station returns the ATIM ACK (Acknowledgement) to the station transmitting the ATIM frame, and remains awake after the ATIM window ends. After the end of the ATIM window, the station sending ATIM frames uses the DCF (distributed coordination function) procedure to transmit the buffered data frames to its intended destination, and the destination acknowledges receipt. For a more detailed presentation, please refer to IEEE 802.11 specification.

FIG. 3 is a schematic diagram illustrating an example of power management in an ad hoc network based on IEEE 802.11. As shown in FIG. 3, when a BI 1 begins (the timing is referred to as TBTT (Target Beacon Transmission Time)), stations X and Y compete to transmit a beacon frame for timing synchronization. It is understood that, in the example of FIG. 3, station X transmits a beacon frame for timing synchronization between stations comprising station X in the network. Since no ATIM frame is received in the ATIM window (AW for short), both stations X and Y enter the doze state (S) after the AW ends. BI 2 begins, and station X successfully transmits a beacon frame. Since station X receives an ATIM frame A from station Y in the AW of BI 2, station X returns a ATIM ACK a to station Y, and remains awake after the AW ends. After the AW ends, station Y can transmit a data frame D to station X, and station X returns a data ACK d to station Y after receiving the data frame D.

As described, in IEEE 802.11, each station in power saving mode must wake up in the ATIM window of "every" BI even if battery power is low or there is no traffic for it. Hence there is a need for each power saving station to dynamically tune its listen interval (the number of BIs between two adjoining AWs) according to the remaining battery power status or other QoS considerations. Obviously, the LI value is fixed at "one" in IEEE 802.11. In the invention, the LI of a power saving station can be adjusted according to parameters of quality of service or the remaining power of the station, substantially reducing power consumption on station.

BRIEF SUMMARY OF THE INVENTION

Adaptive power management methods and systems for wireless networks are provided.

In an embodiment of an adaptive power management method for use in a first station and a second station, BIs comprising NBIs (Normal Beacon Intervals), BBIs (Beacon-Window-Only Beacon Intervals), and SBIs (Sleep Beacon Intervals) are provided when the first and second stations stay in a PS mode. The first and second stations enter the NBI every certain number of BIs for data transmission, where the certain number of BIs is LI. If the LI value is n, the BIs are notated as 0th, 1st, 2nd, . . . , and n−1th BIs, respectively. First, the first and second stations respectively determine the 0th BI of the LI is a NBI, and determine the number and position of BBIs within the LI, where the positions of the NBI and BBIs in the LI form a cyclic difference set. Each station broadcasts a beacon frame comprising work information within a beacon window if the station stays in the BBI, in which the work information comprises a RBI (the remaining number of BIs) before arrival of the subsequent ATIM window. After the beacon window ends, the station enters a doze state. Once the first station correctly receives the beacon frame from the second station, the first station predicts the awake/sleep schedule and the NBI of the second station according to the RBI in the work information, and transmits data frames to the second station at the NBI of the second station based on the IEEE 802.11.

An embodiment of an adaptive power management system for wireless networks comprises a wireless network such as an ad hoc network comprising a first station and a second station. The first and second stations enter a NBI every certain number of BIs for data transmission, where the certain number of BIs is LI. If the LI value is n, the BIs are notated as 0th, 1st, 2nd, . . . , and n−1th BIs, respectively. First, the first and second stations respectively determine the LI value, determine that the 0th BI of the LI is a NBI, and determine the number and position of BBIs within the LI, where the positions of the NBI and BBIs in the LI form a cyclic difference set. Each station broadcasts a beacon frame comprising work information within a beacon window if the station stays in the BBI, in which the work information comprises a RBI before arrival of the subsequent ATIM window. Once the first station correctly receives the beacon frame from the second station, the first station predicts the awake/sleep schedule and the NBI of the second station according to the RBI in the work information, and transmits data frames to the second station at the NBI thereof.

In an embodiment of an adaptive power management method for use in a first station, the second station enters a NBI (Normal Beacon Interval) every certain number of BIs (Beacon Intervals) for data transmission, where the certain number is a LI (Listen Interval) value. The 0th BI in the LI is set as the NBI. The BIs in the LI are notated as 0th, 1st, 2nd, . . . , and n−1th BIs, respectively, where n is the LI value.

A number of BBIs (Beacon-Window-Only Beacon Intervals) and positions thereof within the LI are determined. The LI value is one or a prime number which is larger than two, and the positions of the NBI and BBIs in the LI form a cyclic difference set. The second station transmits a beacon frame to a first station within at least one BW, and receives a data frame from the first station at the NBI. The beacon frame comprises a station identification and a RBI representing the remaining number of BIs between the BBI where the beacon frame is transmitted and the NBI. The second station receives a data frame from the first station at the NBI.

Adaptive power management methods and systems for wireless networks may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein:

FIG. 13 is an example of an awake/sleep schedule table.

DETAILED DESCRIPTION OF THE INVENTION

Adaptive power management methods and systems for wireless networks are provided.

Figure 1:
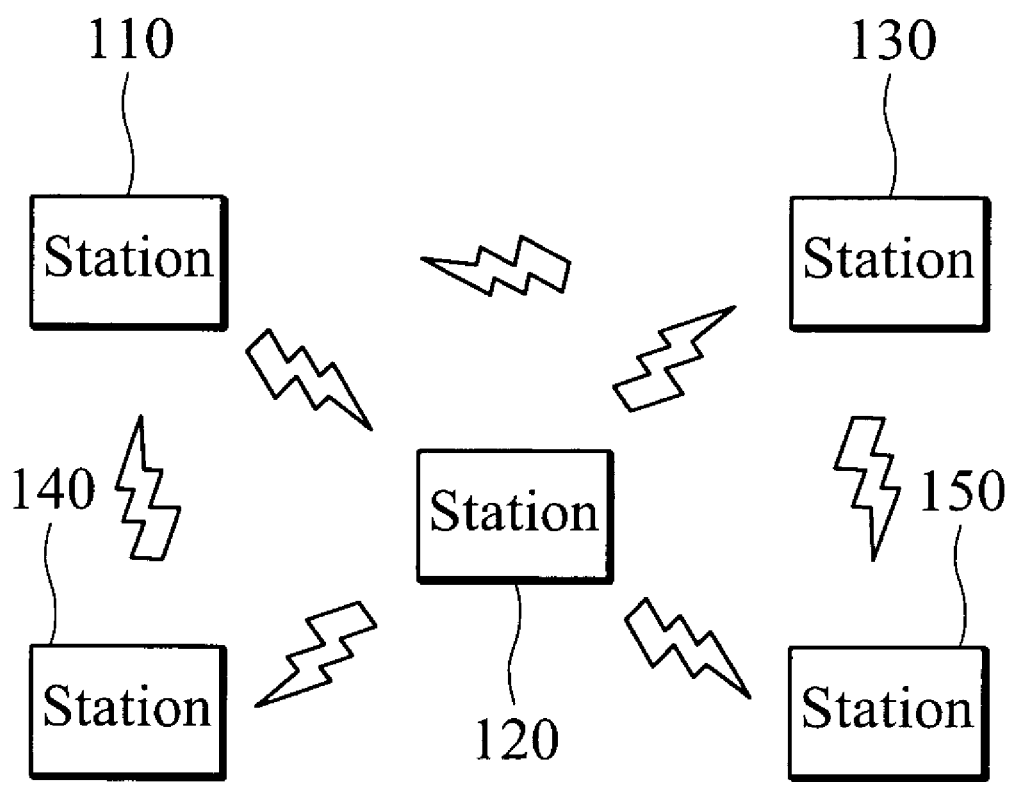
FIG. 1 is a schematic diagram illustrating an ad hoc network.
Figure 2:
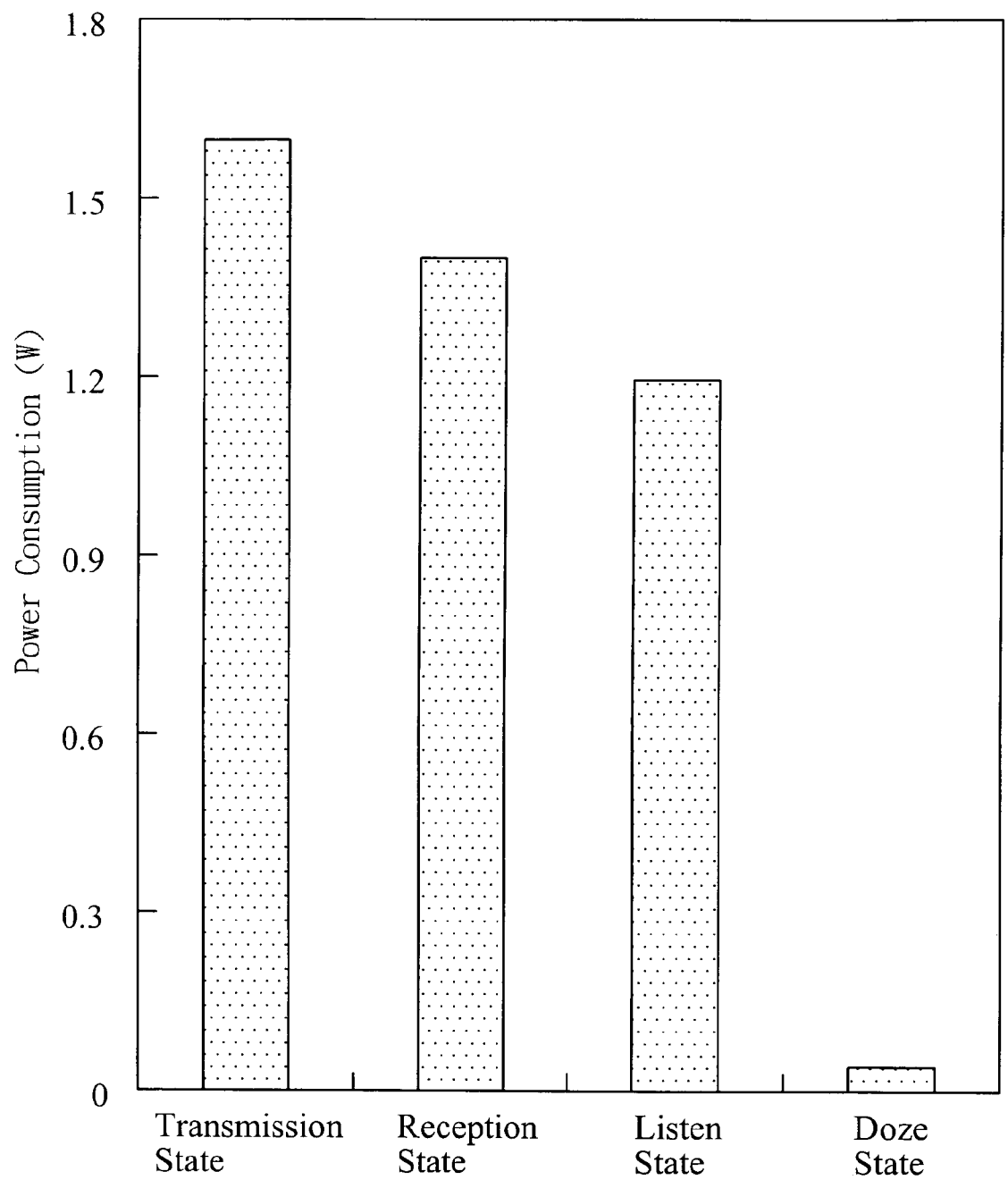
FIG. 2 is a schematic diagram illustrating a power consumption model of a general wireless network adapter.
Figure 3:
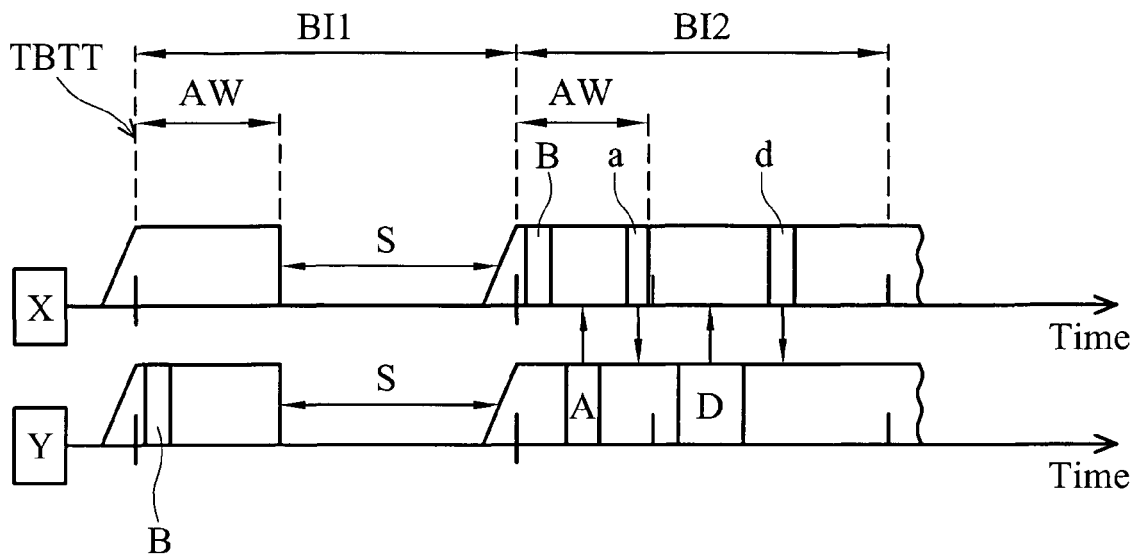
FIG. 3 is a schematic diagram illustrating an example of power management in an ad hoc network based on IEEE 802.11.
Figure 4:
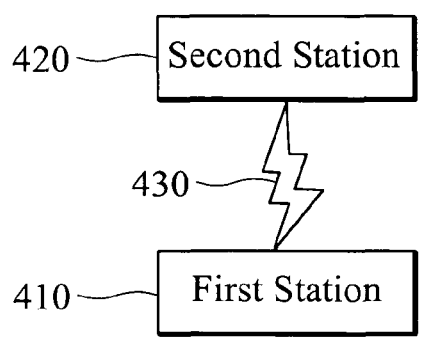
FIG. 4 is a schematic diagram illustrating an embodiment of an adaptive power management system.

FIG. 4 is a schematic diagram illustrating an embodiment of a power management system. As shown in FIG. 4, the adaptive power management system 400 comprises a wireless network such as an ad hoc wireless network comprising at least a first station 410 and a second station 420. The first station 410 and the second station 420 can be devices with wireless communication capability, such as computers, access points/base stations, PDAs, mobile phones, and smart phones, but are not limited thereto. The first station 410 and the second station 420 can communicate with each other using radio waves 430.

In the invention, the BI comprises NBIs (Normal Beacon Intervals), BBIs (Beacon-Window-Only Beacon Intervals), and SBIs (Sleep Beacon Intervals).

Figure 5:
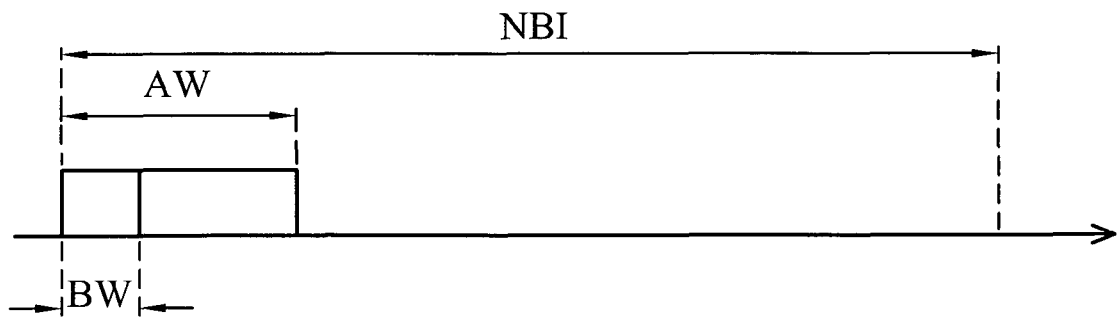
FIG. 5 is a schematic diagram illustrating an embodiment of a NBI.
Figure 6:
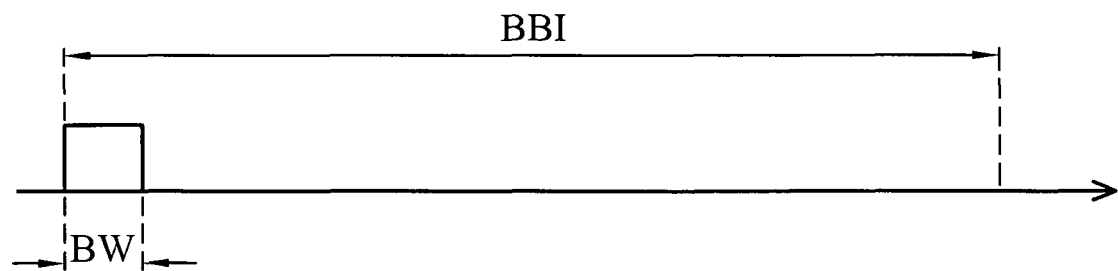
FIG. 6 is a schematic diagram illustrating an embodiment of a BBI.
Figure 7:
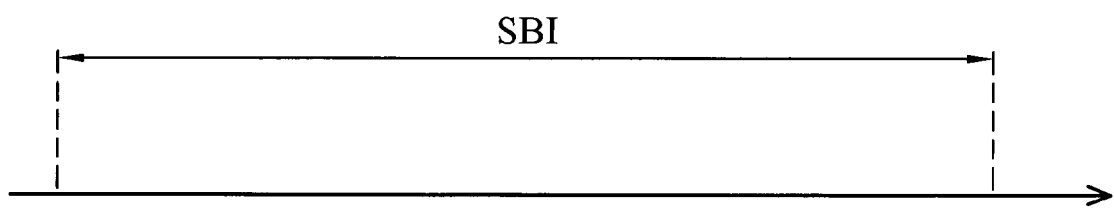
FIG. 7 is a schematic diagram illustrating an embodiment of a SBI.

FIG. 5 is a schematic diagram illustrating an embodiment of a NBI. As shown in FIG. 5, the NBI includes an AW comprising a BW (Beacon Window). It is understood that the BW must be less than the AW. Stations can transmit data in the NBI. Specifically, stations can transmit and receive beacon frames within the BW. Stations can transmit and receive ATIM frames and ATIM ACKs within the AW except during the interval of the BW. If a station receives an ATIM frame within the AW, the station must return an ATIM ACK to a station transmitting the ATIM frame. If a station receives an ATIM frame within the AW, the station remains awake after the AW ends to await reception of data frames, and returns a data ACK if a data frame is received. FIG. 6 is a schematic diagram illustrating an embodiment of a BBI. As shown in FIG. 6, the BBI includes a BW. Similarly, stations can transmit and receive beacon frames within the BW. Stations enter the doze state within the BBI except during the interval of the BW. In some embodiments, no matter whether a beacon frame from other stations is received, each station must transmit its own beacon frames to other stations in its own BWs. FIG. 7 is a schematic diagram illustrating an embodiment of a SBI. Stations enter the doze state in the SBI.

It is understood that each station can set a LI (Listen Interval) value, and enter the NBI every certain number of BIs, where the certain number is LI.

Further, the beacon frame transmitted within the BW comprises the MAC address of the station, the LI value and a RBI (the remaining number of BIs) before arrival of the subsequent ATIM window. The RBI is the remaining number of BIs within a LI, that is, the remaining number of BIs between the BBI where the beacon frame is transmitted and the NBI.

Figure 8:
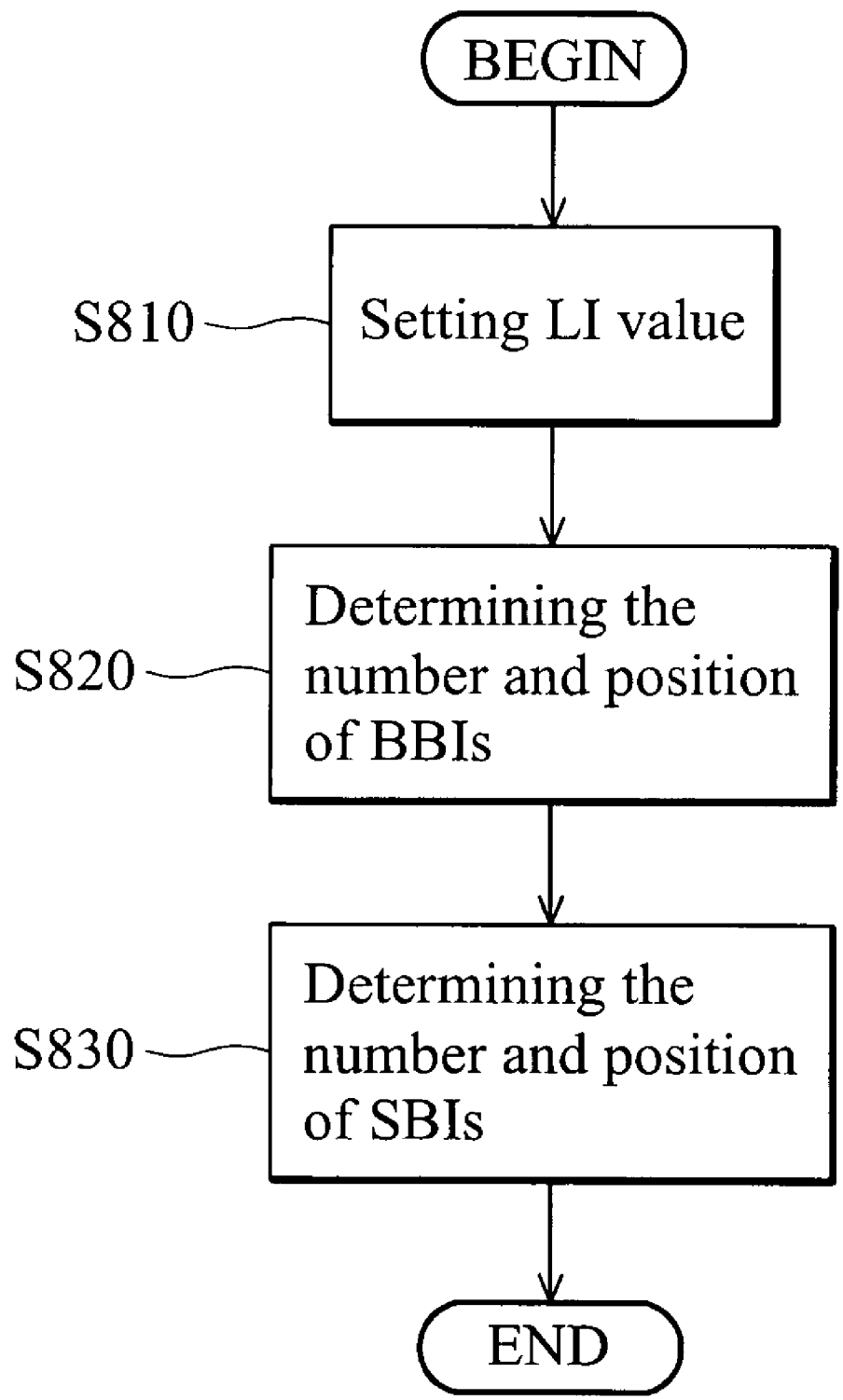
FIG. 8 is a flowchart showing an embodiment of an initial setting method for stations.

FIG. 8 is a flowchart showing an embodiment of an initial setting method for stations. In step S810, the LI value is set. In step S820, the number and position of BBIs within the LI are set, and in step S830, the number and position of SBIs within the LI are set.

If the LI value is n, the number of BIs in the LI is n, and the BIs are notated as 0th, 1st, 2nd, . . . , and n−1th BIs, respectively. Each station operating in the PS mode adaptively determines the LI value according to residual power state, quality-of-service requirements, or other considerations. In this embodiment, the LI value is one or a prime number is larger than two. In the LI, the 0th BI is a NBI, the number of BBIs in the LI is k−1, and the number of SBIs in the LI is n−k, in which k<n. That is, in this embodiment, if the LI value is n, and the $b_0$th, $b_1$th, . . . , and $b_{k-1}$th BIs comprise BWs, the station setting for adaptive power management follows: (1) n is one or a prime number which is larger than two. (2) $B=\{b_0, b_1, b_2, \ldots b_{k-1}\}$, $b_0=1$ and B is a partial set of $\{0, 1, 2, \ldots, n-1\}$. (3) B is a cyclic difference set. That is the positions of the NBI and BBIs in the LI form a cyclic difference set. For two integers p and q, $p+B=\{p+b_0 \pmod n), p+b_1 \pmod n), \ldots, p+b_{k-1} \pmod n)\}$, and $q+B=\{q+b_0 \pmod n), q+b_1 \pmod n), \ldots, q+b_{k-1} \pmod n)\}$. The intersection of p+B and q+B is not an empty set.

Figure 9:
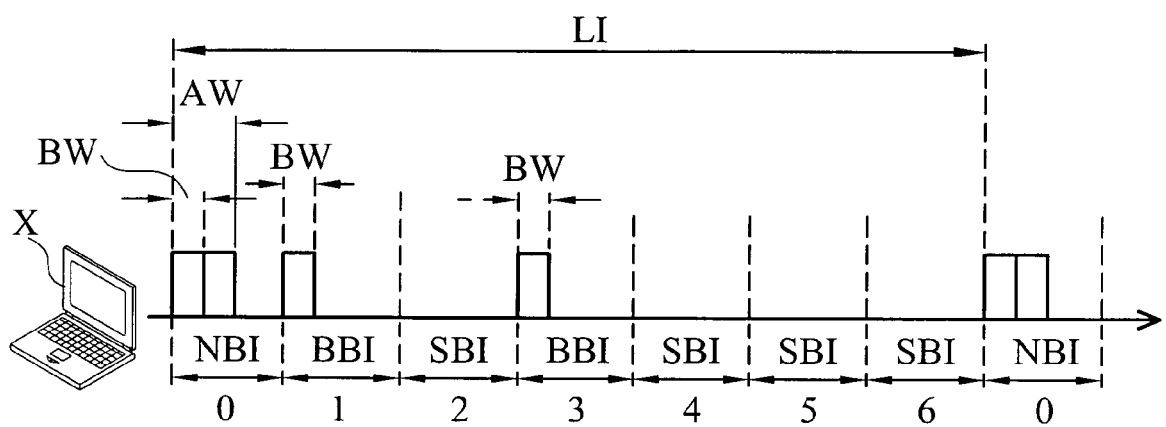
FIG. 9 is a schematic diagram illustrating an embodiment of an example of initial setting for a station.

FIG. 9 is a schematic diagram illustrating an embodiment of an example of initial setting for a station. In the example of FIG. 9, n=7 and k=3. The LI value of station X is 7, that is, station X enters a NBI every 7 BIs. Station X can transmit data in the NBI. In this example, the 0th BI is a NBI, the 1st and 3rd BIs are BBIs, and others are SBIs. Therefore, 3 BWs comprising the BW in the NBI are in the LI, and station X can transmit and receive beacon frames within the BWs. In this example, $B=\{b_0, b_1, b_2\}=\{0, 1, 3\}$ is a cyclic difference set. For example, $5+B=\{5+0 \pmod 7), 5+1 \pmod 7), 5+3 \pmod 7)\}=\{5, 6, 1\}$, and the intersection of B and 5+B is {1}, not an empty set.

In some embodiments, an awake/sleep schedule table can be preset in the station. The awake/sleep schedule table stores cyclic difference sets corresponding to the various LI values. As described, the LI value is one or a prime number is larger than two. FIG. 13 is an example of an awake/sleep schedule table. The awake/sleep schedule table 1300 stores the positions of the NBI and BBIs in the LI under various LI values. After the LI value is set, the station can set the number and position of the NBI and BBIs in the LI by consulting the table.

Figure 10:
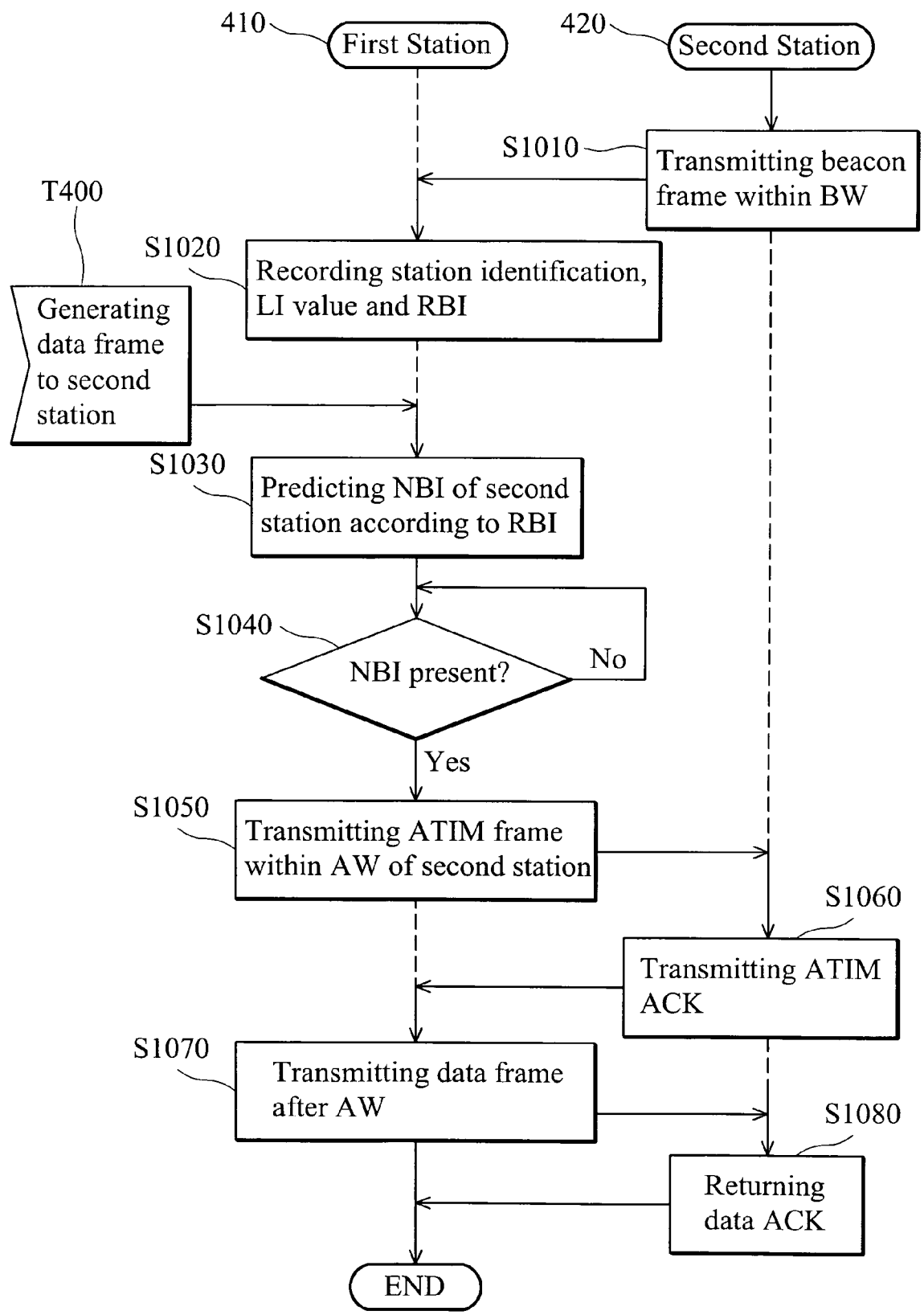
FIG. 10 is a flowchart showing an embodiment of a data transmission method.

FIG. 10 is a flowchart showing an embodiment of a data transmission method. It is understood that the station 420 transmits beacon frames to the first station 410, and the first station 410 transmits data frames to the second station 420. At the same time, the first station 410 can transmit beacon frames to the second station 420, the related details of which are omitted here.

In step S1010, the second station 420 transmits beacon frames to the first station 410 within the BWs. Each beacon frame comprises the identification such as MAC address of the second station 420, the LI value and the RBI. After the first station 410 receives a beacon frame from the second station 420, in step S1020, the identification such as MAC address of the second station 420, the LI value and the RBI are stored in a storage device (not shown) such as a cache. At time T400, the first station 410 generates a data frame to the second station 420. In step S1030, the first station 410 predicts the NBI of the second station 420 according to the LI and RBI. In step S1040, it is determined whether the NBI of the second station 420 is present in every BIs. If not, the procedure remains at step S1040. If so, in step S1050, the first station 410 transmits an ATIM frame to the second station 420 within the AW of the NBI of the second station 420. After the second station 420 receives the ATIM frame from the first station 410, in step S1060, the second station 420 returns an ATIM ACK to the first station 410. It is understood that if the second station 420 receives the ATIM frame within the AW, the second station 420 remains awake after the AW ends, awaiting reception of data frames from the first station 410. After the AW ends, in step S1070, the first station 410 transmits a data frame to the second station 420. After the second station 420 receives the data frame, in step S1080, the second station 420 returns a data ACK to the first station 410.

Figure 11:
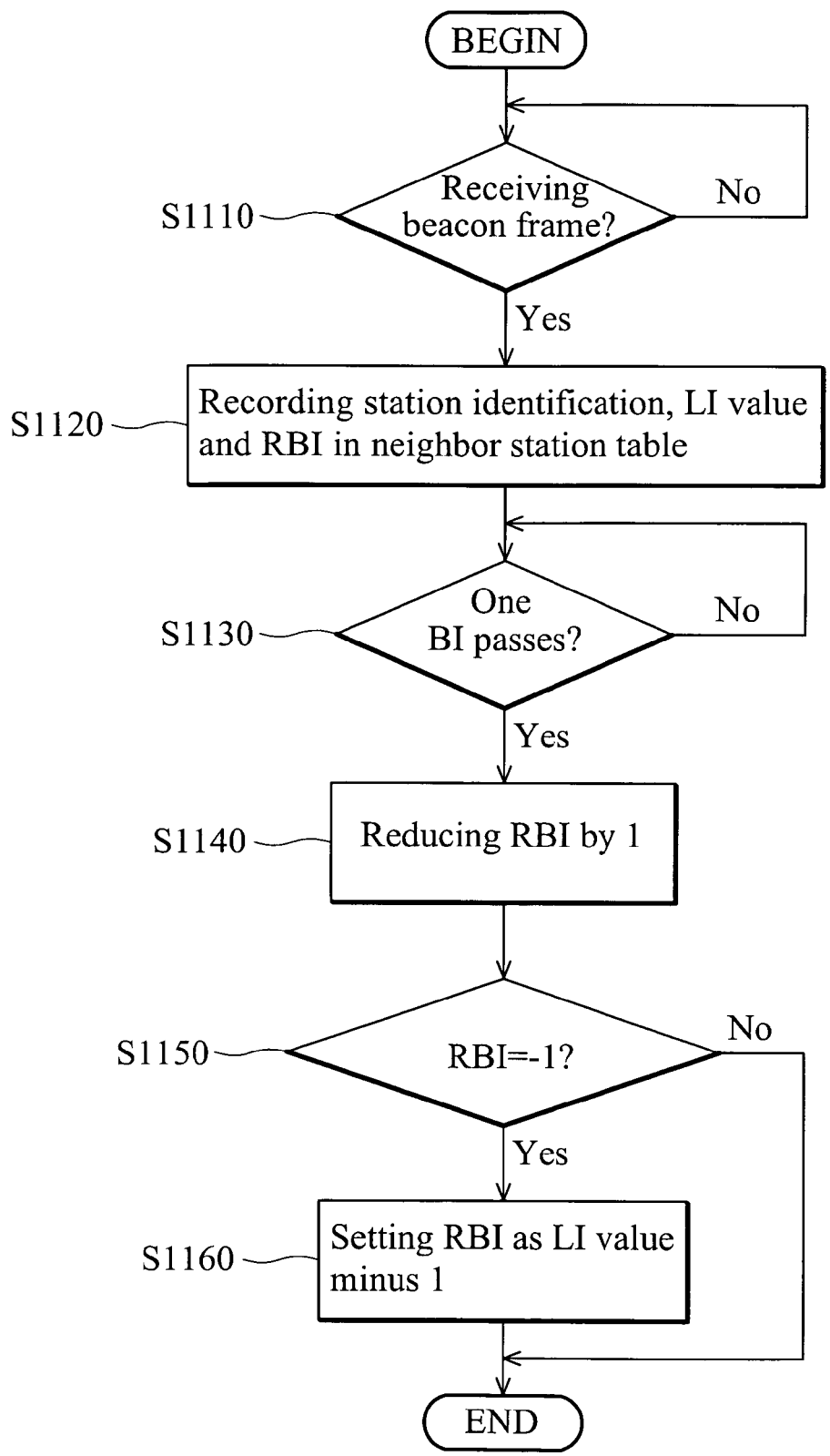
FIG. 11 is a flowchart showing an embodiment of a method for neighbor station table maintenance.

Note that respective stations record relational information of neighbor stations in a neighbor station table. FIG. 11 is a flowchart showing an embodiment of a method for neighbor station table maintenance. In step S1110, it is determined whether a beacon frame is received from a station. If not, the procedure remains at step S1110. If so, in step S1120, the station identification, the LI value and the RBI in the beacon frame are recorded in the neighbor station table. In step S1130, it is determined whether a BI passes. If not, the procedure remains in step S1130. If so, in step S1140, the RBI of respective records in the neighbor station table is reduced by 1, and in step S1150, it is determined whether the RBI equals −1. If not, the procedure is complete. If so, in step S1160, the RBI is set as the LI value minus 1.

Figure 12:
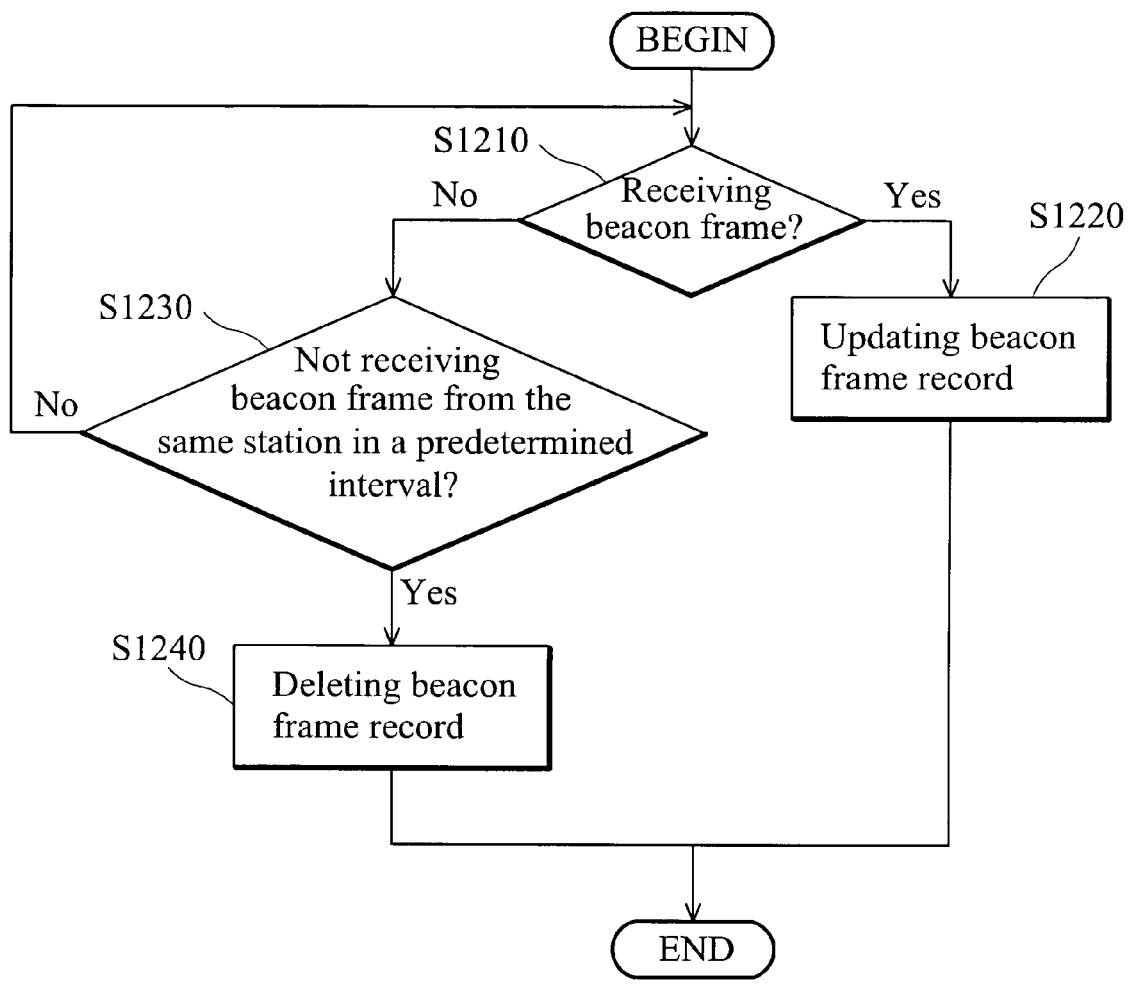
FIG. 12 is a flowchart showing another embodiment of a method for neighbor station table maintenance.

FIG. 12 is a flowchart showing another embodiment of a method for neighbor station table maintenance. In step S1210, it is determined whether a beacon frame is received from a station. If so, in step S1220, the LI value and the RBI corresponding to the station are updated. If not, in step S1230, it is determined whether beacon frames transmitted from the same station are received in a predetermined interval. If the time difference between two beacon frames does not exceed the predetermined interval, the procedure returns to step S1210. If no new beacon frame corresponding to the same station is received, in step S1240, the related information comprising the station identification, the LI value and the RBI corresponding to the station in the neighbor station table is deleted.

Adaptive power management methods and systems for wireless networks, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An adaptive power management method for use in a first station and a second station in an ad hoc wireless local area network, in which the second station enters an NBI (Normal Beacon Interval) every certain number of BIs (Beacon Intervals) for power saving and data reception, where the certain number of consecutive BIs is called an LI (Listen Interval), comprising:

determining the length of LI (in units of BI) which is one or a prime number that is larger than two, wherein the BIs in the LI are denoted as 0th, 1st, 2nd, . . . , and (n−1)th BIs, respectively, where n is the value of LI, and setting the 0th BI in the LI as the NBI, wherein the NBI comprises an AW (ATIM Window) comprising a BW (Beacon Window), where a station transmits its beacon frame within the BW, transmits and receives ATIM frames within the AW, returns an ATIM ACK (acknowledgement) to a specific station transmitting the ATIM frame and remains awake after the AW ends to wait for the reception of data frames when receiving an ATIM frame within the AW, and returns a data ACK if a data frame is received;

determining the number of BBIs (Beacon-Window-Only Beacon Intervals) and determining the positions of the NBI and BBIs in the LI to form a cyclic difference set, in which each of the BBIs comprises a BW (Beacon Window), and the second station broadcasts a beacon frame within the BW of every BBI, and enters a doze state in the BBI after the end of the BW, the beacon frame comprises a station identification and an RBI (Remaining number of BIs) representing the remaining number of BIs between the BBI and the NBI, wherein the beacon frame is transmitted in the BBI; and the first station receiving the beacon frame from the second station in the ad hoc wireless local area network, recording the RBI corresponding to the second station, predicting the NBI of the second station according to the RBI, and transmitting a data frame to the second station at the NBI of the second station in the ad hoc wireless local area network.

2. The method of claim 1 further comprising the second station resetting the LI value according to residual power state after the LI ends.

3. The method of claim 1 further comprising the second station transmitting the beacon frame comprising the LI value to the first station.

4. The method of claim 1 further comprising:
the first station reducing the RBI corresponding to the second station in a neighbor station table by 1 if one of the BI passes; and
setting the RBI as the value of LI minus 1 if the RBI equals −1.

5. The method of claim 1 further comprising the first station deleting data corresponding to the second station if no other beacon frame is received from the second station in a predetermined interval.

6. The method of claim 1 further comprising the second station determining the number of SBIs (Sleep Beacon Intervals), in which the second station enters a doze state in the SBIs.

7. The method of claim 6 wherein the number of the BBIs and the SBIs equals the LI value minus 1.

8. The method of claim 1 wherein the NBI comprises an AW (ATIM Window) comprising a BW (Beacon Window), and the second station transmits the beacon frame within the BW of the NBI.

9. The method of claim 8 further comprising:
the first station transmitting an ATIM frame to the second station within the AW of the NBI of the second station;
the second station transmitting an ATIM ACK to the first station in response to the ATIM frame;
the first station transmitting the data frame to the second station within the NBI after the AW ends; and
the second station transmitting a data ACK to the first station after receiving the data frame.

10. An adaptive power management system for an ad hoc wireless local area network, comprising:
a second station entering an NBI (Normal Beacon Interval) every certain number of BIs (Beacon Intervals) for power saving and data reception, where the certain number of consecutive BIs is called an LI (Listen Interval), determining the length of LI (in units of BI) which is one or a prime number that is larger than two, wherein the BIs in the LI are denoted as 0th, 1st, 2nd, . . . , and (n−1)th BIs, respectively, where n is the value of LI, and setting the 0th BI in the LI as the NBI, wherein the NBI comprises an AW (ATIM Window) comprising a BW (Beacon Window), where a station transmits and receives beacon frames its beacon frame within the BW, transmits and receives ATIM frames within the AW, returns an ATIM ACK (acknowledgement) to a specific station transmitting the ATIM frame and remains awake after the AW ends to wait for the reception of data frames when receiving an ATIM frame within the AW, and returns a data ACK if a data frame is received; determining the number of BBIs (Beacon-Window-Only Beacon Intervals) and determining the positions of the NBI and BBIs in the LI to form a cyclic difference set, in which each of the BBIs comprises a BW (Beacon Window), and the second station broadcasts a beacon frame within the BW of every BBI, and enters a doze state in the BBI after the end of the BW, the beacon frame comprises a station identification and an RBI (Remaining number of BIs) representing the remaining number of BIs between the BBI and the NBI, wherein the beacon frame is transmitted in the BBI; and
a first station receiving the beacon frame from the second station in the ad hoc wireless local area network, recording the RBI corresponding to the second station, predicting the NBI of the second station according to the RBI, and transmitting a data frame to the second station at the NBI of the second station in the ad hoc wireless local area network.

11. The system of claim 10 wherein the second station further resets the LI value according to residual power state after the LI ends.

12. The system of claim 10 wherein the second station further transmits the beacon frame comprising the LI value to the first station.

13. The system of claim 10 wherein first station further deletes data corresponding to the second station if no other beacon frame is received from the second station in a predetermined interval.

14. The system of claim 10 wherein the second station further determines the number of SBIs (Sleep Beacon Intervals), in which the second station enters a doze state in the SBIs.

15. The system of claim 14 wherein the number of the BBIs and the SBIs equals the LI value minus 1.

16. The system of claim 10 wherein the NBI comprises an AW (ATIM Window) comprising a BW (Beacon Window), and the second station transmits the beacon frame within the BW of the NBI.

17. The system of claim 16 wherein the first station further transmits an ATIM frame to the second station within the AW of the NBI of the second station, the second station transmits an ATIM ACK to the first station in response to the ATIM frame, the first station transmits the data frame to the second station within the NBI after the AW ends, and the second station transmits a data ACK to the first station after receiving the data frame.

* * * * *